(12) United States Patent
Naganuma et al.

(10) Patent No.: US 7,440,752 B2
(45) Date of Patent: Oct. 21, 2008

(54) MOBILE COMMUNICATION TERMINAL, APPARATUS AND SYSTEM FOR DELIVERING APPLICATION SOFTWARE, METHOD FOR CONTROLLING EXECUTION STATE DISPLAY, PROGRAM, AND RECORDING MEDIUM

(75) Inventors: Takefumi Naganuma, Kyoto (JP); Masayuki Tsuda, Toyko (JP); Hideyuki Nagasawa, Yokohama (JP); Eriko Oseki, Yokohama (JP); Fukiko Maeda, Yokohama (JP); Nobuyuki Watanabe, Sayama (JP); Mao Asai, Yokosuka (JP); Takashi Kondo, Tokyo (JP); Kazuhiro Yamada, Yokohoma (JP); Dai Kamiya, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 219 days.

(21) Appl. No.: 10/497,656

(22) PCT Filed: Dec. 5, 2002

(86) PCT No.: PCT/JP02/12774

§ 371 (c)(1),
(2), (4) Date: Jun. 4, 2004

(87) PCT Pub. No.: WO03/048937

PCT Pub. Date: Jun. 12, 2003

(65) Prior Publication Data

US 2004/0242281 A1 Dec. 2, 2004

(30) Foreign Application Priority Data

Dec. 7, 2001 (JP) ............................. 2001-374661

(51) Int. Cl.
*H04M 3/00* (2006.01)

(52) U.S. Cl. .................... 455/420; 455/418; 455/419; 455/423; 455/414.1; 455/566

(58) Field of Classification Search ......... 455/418–420, 455/423, 414.1, 566, 550.1, 90.1
See application file for complete search history.

(56) References Cited

U.S. PATENT DOCUMENTS 5,668,591 A * 9/1997 Shintani ..................... 725/140

(Continued)

FOREIGN PATENT DOCUMENTS

CN 1283943 2/2001

(Continued)

OTHER PUBLICATIONS

Edited by Ascii Shoseki Henshubu, "i-mode Java Programming Standalone Application Hen Kaitei Shinban", 1 st Edition, Ascii Corp., pp. 19, 20, 46-49, 53-57, ISBN 4-7561-3790-3, (with partial English translation).

(Continued)

*Primary Examiner*—Matthew Anderson
*Assistant Examiner*—Dominic E Rego
(74) *Attorney, Agent, or Firm*—Oblon, Spivak, McClelland, Maier & Neustadt, P.C.

(57) ABSTRACT

An object of the present invention is to enable smooth performance testing of an application software on a mobile communication terminal and to make execution state information about the application software available solely to authorized persons. The cellular phone 1 according to the present invention comprises a display 5, wireless unit 7, and control unit 2. As used herein, the display 5 is a display apparatus for displaying information. From a delivery server, the wireless unit 7 receives application software together with attribute information that indicates whether execution state information stored in a specific storage area by the application software should be displayed. The control unit 2 performs a control routine such that the execution state information is displayed by the display 5 when the attribute information indicates that the execution state information should be displayed, and the execution state information is not displayed by the display 5 when the attribute information indicates that the execution state information should not be displayed.

12 Claims, 8 Drawing Sheets

U.S. PATENT DOCUMENTS

| | | | |
|---|---|---|---|
| 6,643,124 B1 * | 11/2003 | Wilk | 361/681 |
| 6,757,001 B2 * | 6/2004 | Allport | 715/840 |
| 6,785,561 B1 | 8/2004 | Kim | |
| 7,203,522 B2 * | 4/2007 | Hama et al. | 455/566 |
| 2002/0120738 A1 * | 8/2002 | Morimoto et al. | 709/224 |
| 2005/0197115 A1 * | 9/2005 | Clark et al. | 455/426.1 |

FOREIGN PATENT DOCUMENTS

| | | |
|---|---|---|
| JP | 1-195551 | 8/1989 |
| JP | 1-226041 | 9/1989 |
| JP | 2-139640 | 5/1990 |
| JP | 2-220145 | 9/1990 |
| JP | 6-149616 | 5/1994 |
| JP | 6-274370 | 9/1994 |
| JP | 2001-189972 | 7/2001 |
| JP | 2002-99441 | 4/2002 |

OTHER PUBLICATIONS

"I Appli Contents Kaihatsu Guide for 504i (Shosaihen) Dai 1.0 Ban", NTT Docomo Inc., InternetURL:http://www.nettdocomo.co.jp/p_s/imode/java/pdf/jguide504_ 020517.pdf, (with partial English translation) May 17, 2002.

"Java Contents", NTT Docomo Inc., InternetURL:http//web.archive.org/web/20020611014421/http://www.nttdocomo.co.jp/mc-muser/i/java/index.html (with partial English translation) Jun. 11, 2002.

"F504i", NTT Docomo Inc. Kanagawa Branch, InternetURL:http://web.bay.nttdocomo.co.jp/contents/manual/body/f504i/menu_f504i.html, (with partial English translation) Jun. 19, 2002.

U.S. Appl. No. 10/497,656, filed Jun. 4, 2004, Naganuma et al.

U.S. Appl. No. 10/496,783, filed Jun. 4, 2004, Naganuma et al.

* cited by examiner

MOBILE COMMUNICATION TERMINAL, APPARATUS AND SYSTEM FOR DELIVERING APPLICATION SOFTWARE, METHOD FOR CONTROLLING EXECUTION STATE DISPLAY, PROGRAM, AND RECORDING MEDIUM

TECHNICAL FIELD

The present invention relates to an application software delivery apparatus for delivering application software that outputs execution state information to a specific storage area during execution, a mobile communication terminal for communicating with the application software delivery apparatus, an application software delivery system configured by incorporating these, an execution state display control method for the mobile communication terminal, an execution state display control program executed by a computer provided to the mobile communication terminal, and a computer-readable recording medium on which this execution state display control program is recorded.

BACKGROUND ART

In development of application software dynamically downloaded and executed by a mobile communication terminal, an object code created in a development environment (emulator or the like) on a personal computer (PC) is sent to a mobile communication terminal for testing the performance of the object code, and the developer tests the performance by actually running the object code on the mobile communication terminal. During such performance tests, errors occurred by defects that are present in the code itself, restrictions that are imposed on the mobile communication terminal being tested (limitations of the usable memory area or the like), and other factors. However, conventional mobile communication terminals lack means for notifying the developer of the contents of errors, so the developer needs to embed error-detecting codes in the object code and to determine the causes for these errors on the basis of the codes detected when the errors occurred.

However, such means require that special codes be embedded at all locations within a program where errors can occur, so operating efficiency decreases dramatically in development operations in which repeated performance testing and adjustments must be done. In addition, embedding such special codes creates differences in terms of program execution timing and the like in relation to the final commercial program from which these special codes have been removed, and makes it difficult to perform rigorous timing testing for commercial programs or the like. In particular, embedding special codes is sometimes still insufficient for determining the cause when an error occurs due to restrictions on a mobile communication terminal, forcing the developer to speculate on the cause of the error and to repeatedly adjust and retest the code.

Providing mobile communication terminals with a function for issuing a notification that contains error information has been proposed in order to address the aforementioned problems, but providing a mobile communication terminal with such notification functionality makes it necessary to make performance fault information available to end users, who are not intended to use such error information. This creates the risk that the end user will not be confident about the program or that the information will allow those skilled in the art to infer and copy the application structure. It has also been suggested to use a means whereby a mobile communication terminal for the enduser and a mobile communication terminal for the developer are prepared separately, but in this case the manufacturer of mobile communication terminals needs to develop two different versions of mobile communication terminals, and a greater load is thus imposed on the manufacturer of mobile communication terminals.

An object of the present invention, which was perfected in order to solve the aforementioned problems, is to provide a mobile communication terminal, an application software delivery apparatus, an application software delivery system, an execution state display control method, an execution state display control program, and a computer-readable recording medium that allow information about the execution state of an application to be made available only to appropriate persons while making it possible to test the performance of the application on the mobile communication terminal in a smooth manner.

DISCLOSURE OF THE INVENTION

Aimed at attaining the stated object, the mobile communication terminal pertaining to the present invention is characterized in comprising display means for displaying information; reception means for receiving application software that outputs execution state information to a specific storage area during execution, and for receiving attribute information that indicates whether the execution state information outputted to the specific storage area by the application software should be displayed; and control means for controlling the display output of the execution state information to the display means on the basis of the attribute information received by the reception means.

The reception means on the mobile communication terminal receives application software for outputting (for example, storing) execution state information in a specific storage area during execution, and also receives attribute information for indicating whether the execution state information outputted to the specific storage area by the application software should be displayed. Either the application software or the attribute information can be the preceding element in the transmission sequence.

The control means controls the display output of the execution state information to the display means on the basis of the attribute information received. Specifically, the control means allows the execution state information to be displayed or outputted to the display means when the attribute information indicates that the execution state information should be displayed. By contrast, the control means performs a control routine such that the execution state information is not displayed or outputted to the display means when the attribute information indicates that the execution state information should not be displayed.

Attribute information indicating that execution state information should be displayed is thereby sent to the mobile communication terminal from an application software delivery apparatus during development of application software, whereby the execution state information can be displayed and outputted to the display means of the mobile communication terminal, the efficiency with which the developer detects errors can be improved, and performance testing of applications on the mobile communication terminal can be smoothed.

At the same time, attribute information indicating that execution state information should not be displayed is sent to the mobile communication terminal from the application software delivery apparatus when development of the application software is completed and the product is shipped, whereby control can be performed such that the execution state information is not displayed or outputted to the display means of the mobile communication terminal, and the execution state information can be prevented from being disclosed or leaked to persons (for example, software experts or users of the mobile communication terminal) who are not intended for viewing the execution state information.

In the mobile communication terminal pertaining to the present invention, the following structural aspect can be adopted as the mobile communication terminal for communicating with an application software delivery apparatus. The mobile communication terminal pertaining to the present invention is a mobile communication terminal for communicating with an application software delivery apparatus for delivering application software that stores execution state information in a specific storage area during execution, wherein it is possible to adopt a structure comprising display means for displaying information, reception means for receiving application software together with attribute information that indicates whether the execution state information stored in the specific storage area by the application software should be displayed, from the application software delivery apparatus, and control means for controlling the display output of the execution state information to the display means on the basis of the attribute information received by the reception means.

The control means should be configured such that the execution state information is displayed and outputted by switching the display output to the display means between a screen on which the execution state information is displayed and other screens.

The execution state information should comprise at least one type of information selected from among log information for the execution, parametric information related to the execution, and error information at the time of execution. Specifically, the execution state information may comprise one, two, or more types of this information.

The application software delivery apparatus pertaining to the present invention is characterized in comprising attribute setting means for setting attribute information that indicates whether the execution state information outputted to a specific storage area by application software should be displayed, to the application software which is to be delivered, and transmitting means for transmitting the application software to be delivered and the attribute information that has been set by the attribute setting means.

With this application software delivery apparatus, the operator can use attribute setting means and set attribute information that indicates whether execution state information outputted to a specific storage area by application software should be displayed, to the application software which is to be delivered. The attribute information thus set and the application software to be delivered can be sent to a mobile communication terminal by transmitting means. Either the application software or the attribute information can be the preceding element in the transmission sequence.

In the application software delivery apparatus pertaining to the present invention, the following structural aspect can be adopted as the application software delivery apparatus for communicating with a mobile communication terminal. Specifically, the application software delivery apparatus pertaining to the present invention is an application software delivery apparatus for communicating with a mobile communication terminal, wherein it is possible to adopt a structure comprising attribute setting means for setting attribute information that indicates whether execution state information stored in a specific storage area by application software should be displayed, to the application software which is to be delivered, and transmitting means for transmitting the application software to be delivered and the attribute information that has been set by the attribute setting means, to the mobile communication terminal.

The application software delivery system pertaining to the present invention has a structure characterized in being configured from the above-described mobile communication terminal and application software delivery apparatus, and used for communication between the mobile communication terminal and the application software delivery apparatus.

The invention pertaining to the above-described mobile communication terminal can be described as an invention pertaining to an execution state display control method executed by the mobile communication terminal, as shown below. These are based on substantially the same technological idea and have the same actions and merits.

Specifically, the execution state display control method pertaining to the present invention is an execution state display control method for a mobile communication terminal that comprises display means for displaying information, characterized by having a reception step for receiving application software that outputs execution state information to a specific storage area during execution, and also receiving attribute information that indicates whether the execution state information outputted to the specific storage area by the application software should be displayed; and a control step for controlling the display output of the execution state information to the display means on the basis of the received attribute information.

In the execution state display control method pertaining to the present invention, the following aspect can be adopted as the execution state display control method for a mobile communication terminal that communicates with an application software delivery apparatus. Specifically, the execution state display control method pertaining to the present invention is an execution state display control method for a mobile communication terminal that comprises display means for displaying information and that communicates with an application software delivery apparatus for delivering application software that stores execution state information in a specific storage area during execution, wherein it is possible to adopt an aspect having a reception step for receiving application software together with attribute information that indicates whether the execution state information stored in the specific storage area by the application software should be displayed, from the application software delivery apparatus; and a control step for controlling the display output of the execution state information to the display means on the basis of the received attribute information.

In the control step, the display output of the execution state information should be controlled by switching the display output to the display means between a screen on which the execution state information is displayed and other screens.

The execution state information should comprise at least one type of information selected from among log information for the execution, parametric information related to the execution, and error information at the time of execution.

The execution state display control program pertaining to the present invention is characterized in that a computer provided to a mobile communication terminal comprising display means for displaying information is caused to function as reception means for receiving application software that outputs execution state information to a specific storage area during execution, and for receiving attribute information that indicates whether the execution state information outputted to the specific storage area by the application software should be displayed; and as control means for controlling the display output of the execution state information to the display means on the basis of the attribute information received by the reception means.

The computer-readable recording medium pertaining to the present invention is characterized in that the execution state display control program is recorded thereon. For example, a memory stick, IC chip, magnetic disk, optical disk, CD-ROM, or the like may be adopted as the recording medium.

The objects and other features or merits of the present invention will be apparent to those skilled in the art from the detailed description given below with reference to the accompanying diagrams.

BEST MODES FOR CARRYING OUT THE INVENTION

An embodiment of the present invention will hereafter be described with reference to the accompanying diagrams. In the following description and accompanying diagrams, "application software" is abbreviated as "application." The application described in the present embodiment has the task of storing a log (referred to hereinbelow as "an application log") related to the execution state thereof and a log (referred to hereinbelow as "an error log") related to the errors occurred during execution, in a specific storage area.

Figure 1:
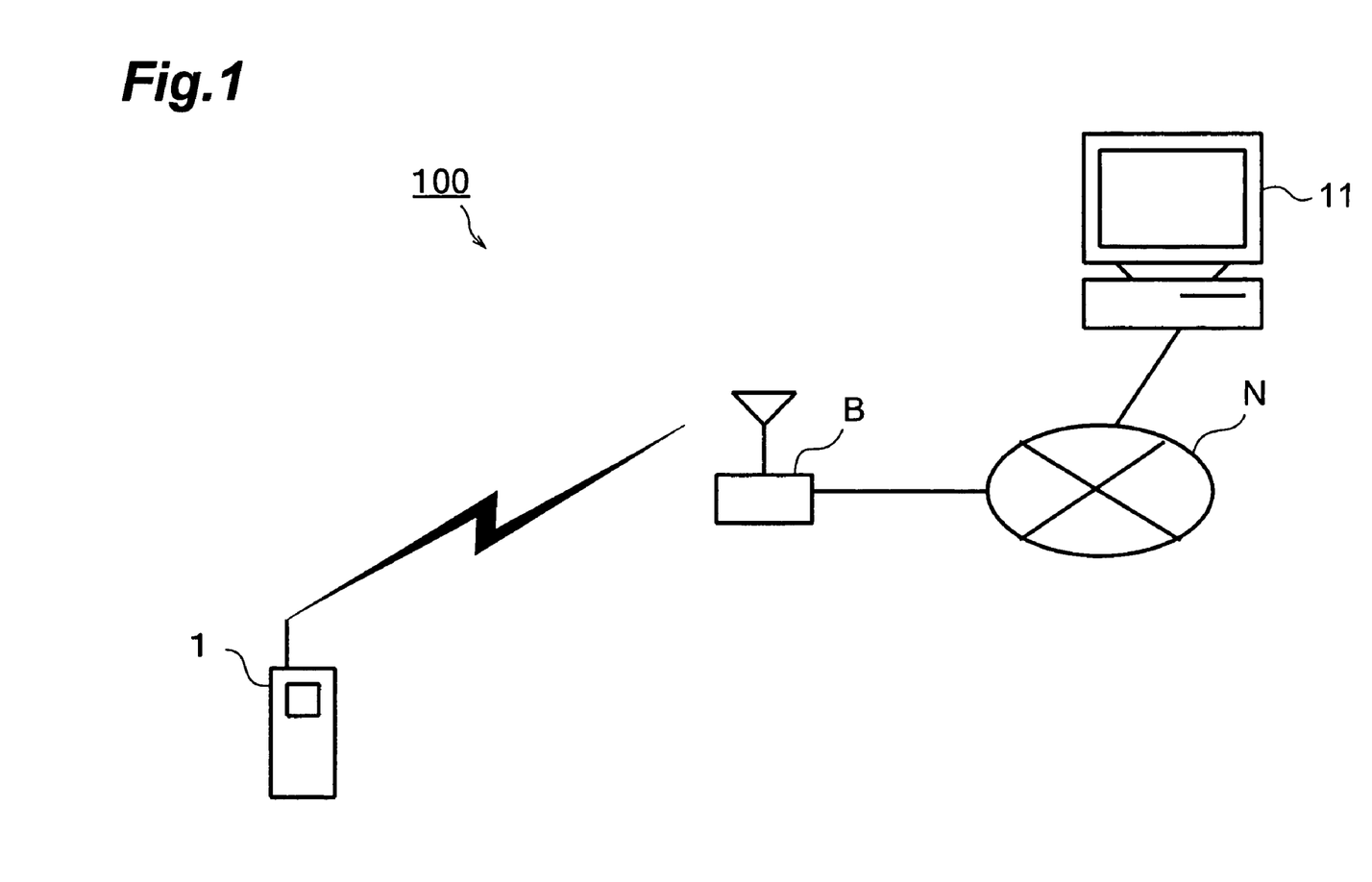
FIG. 1 is a schematic diagram depicting an example of the overall configuration of the application delivery system.

The device structure of the present embodiment will first be described. FIG. 1 is a schematic diagram depicting an example of the overall configuration of the application delivery system 100 according to the present embodiment. As depicted in FIG. 1, the application delivery system 100 comprises a cellular phone 1 (corresponds to a mobile communication terminal) and an application delivery server 11 (corresponds to an application software delivery apparatus). The cellular phone 1 is connected to a packet communication network N via a base station B. Furthermore, the application delivery server 11 is connected by wire to the packet communication network N.

Figure 2:
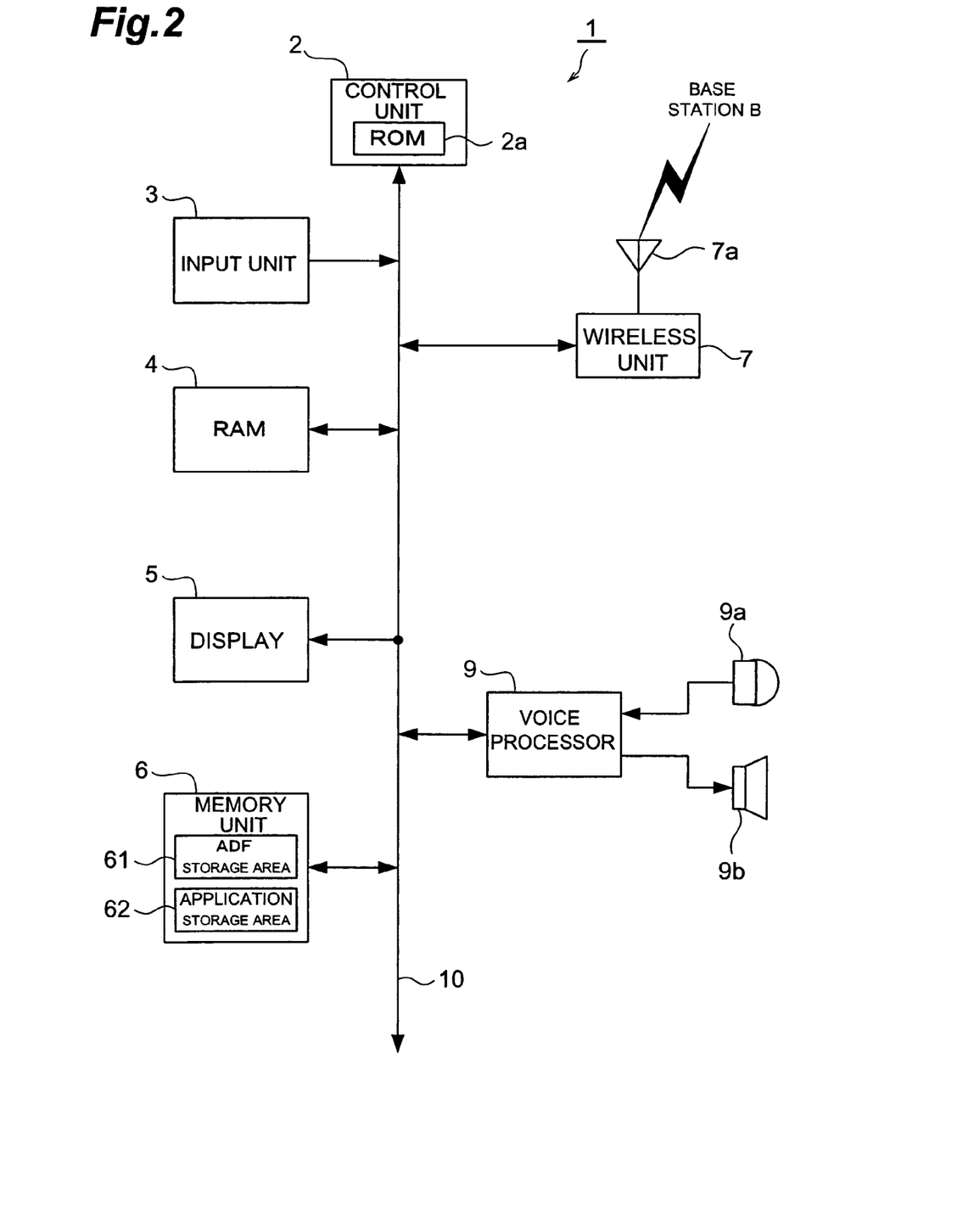
FIG. 2 is a block diagram depicting the functional configuration of a cellular phone.

The internal structure of the cellular phone 1 will hereafter be described in detail with reference to FIG. 2. FIG. 2 is a block diagram depicting the functional configuration of the cellular phone 1. As depicted in FIG. 2, the cellular phone 1 comprises a control unit 2 (corresponds to control means), input unit 3, RAM 4, display 5 (corresponds to display means), memory unit 6, wireless unit 7 (corresponds to reception means), and voice processor 9; and these elements are connected via a bus 10 to enable the input and output of various signals.

The control unit 2 contains ROM (Read Only Memory) 2a, retrieves a program stored in advance in the ROM 2a and deploys it to the RAM 4, and centrally controls each element according to the program. Specifically, the control unit 2 executes the hereinafter described routine on the cellular phone (see FIG. 6) according to the input-signal from the input unit 3 and the program deployed to the RAM 4. Execution of the application downloaded from the application delivery server 11 is also started during this routine. As the application is executed, the application log and error log thereof are temporarily retained in the RAM 4, and are then stored in a specific area within the memory unit 6.

The input unit 3 is provided with various operating buttons for directing power ON/OFF, function selection, and the like; and these operating buttons output input-signals that correspond to instruction specifics to the control unit 2 by being pushed independently or in combination.

The RAM (Random Access Memory) 4 comprises semiconductors or the like, and temporarily stores programs retrieved from the ROM 2a and data retrieved from the memory unit 6 in the various routines executed by the control unit 2. The RAM 4 also has VRAM (Video RAM) function for temporarily retaining data displayed on the display 5.

The display 5 is composed of an LCD (Liquid Crystal Display), EL (Electro Luminescence), or the like, and displays data on a screen according to display signals that are input from the control unit 2.

The memory unit 6 is composed of EEPROM (Electrically Erasable and Programmable ROM) or other nonvolatile semiconductor memory, and stores data necessary for the control unit 2 to execute various routines, data generated as a result of such execution, and the like. For example, the memory unit 6 forms an ADF storage area 61 and an application storage area 62 during execution of the hereafter described application execution routine on a cellular phone.

The ADF storage area 61 is a data area for storing a file composed of data relating to attributes of application software executable by the cellular phone 1 as an ADF (Attribute Definition File).

Figure 3:
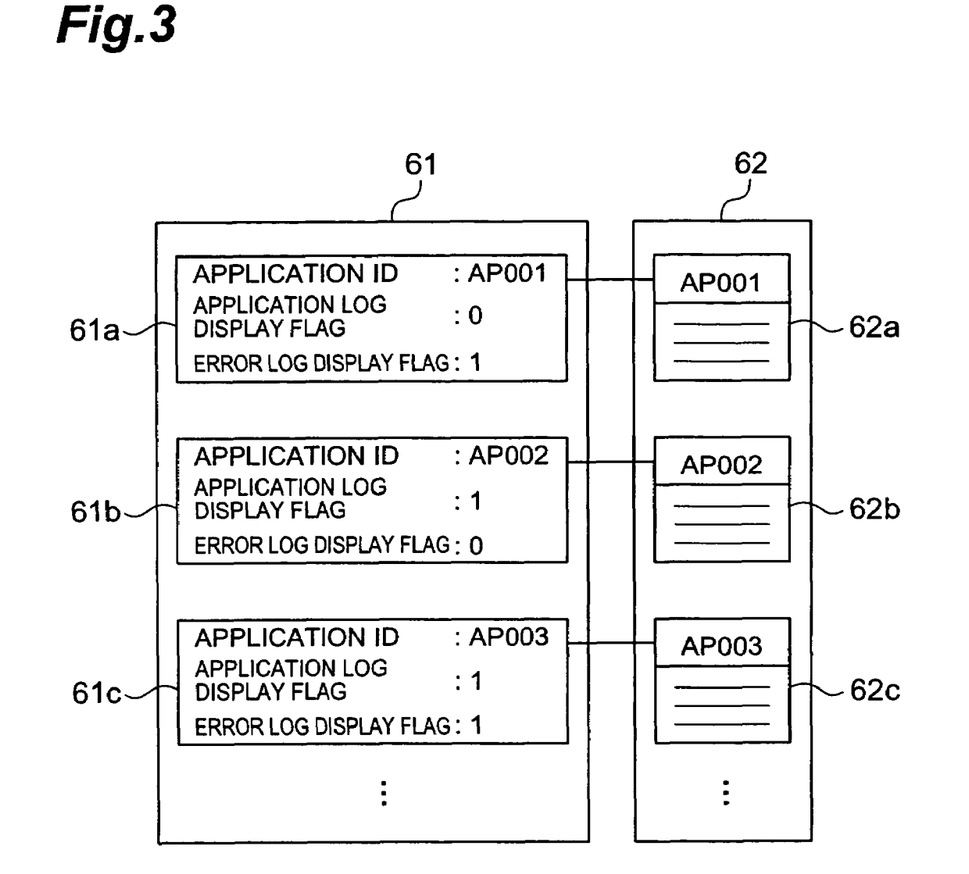
FIG. 3 is a diagram depicting an example of data storage in the ADF storage area and application storage area.

An example of data storage in the ADF storage area 61 will be described hereafter with reference to FIG. 3. As depicted in FIG. 3, a plurality of ADF 61a, 61b, 61c, etc. provided at least with an application ID, application log display flag, and error log display flag are stored in the ADF storage area 61.

The application ID is defined as uniquely allocated data (for example, "AP001", "AP002", "AP003", etc.) for identifying application software. The application ID may consist not only of symbolic data, but also of alphabetical data for displaying the title of application software, the URL (Uniform Resource Locator) of the Web page to be downloaded, or the like, insofar as the stored application software can be identified.

The application log display flag is a flag in which it is indicated with the aid of binary numerical data "1" or "0" whether the application log should or should not be displayed, wherein the application log display flag value of "1" indicates that the application log should be displayed, and "0" indicates that the application log should not be displayed. The error log display flag is a flag in which it is indicated with the aid of binary numerical data "1" or "0" whether the error log should or should not be displayed, wherein the error log display flag value of "1" indicates that the error log should be displayed, and "0" indicates that the error log should not be displayed.

The application storage area 62 is a program area for storing application software that is executable by the cellular phone 1. As depicted in FIG. 3, application software 62*a*, 62*b*, 62*c*, etc. are stored in coordination with the aforementioned application ID. The application software 62*a*, 62*b*, 62*c*, etc. are therefore stored in coordination with an ADF 61*a*, 61*b*, 61*c*, etc. by means of the application ID.

To simplify description, the data comprising the application ID, application log display flag, and error log display flag are shown as being stored in the same storage area (ADF storage area 61), but if a storage embodiment is adopted wherein the data are retrievably coordinated, they need not necessarily be stored in the same storage area.

Again in FIG. 2, the wireless unit 7 comprises a circuit having a modem unit (not shown) for performing modulation/demodulation of signals, and a coding/decoding unit (not shown) for performing coding/decoding of signals; and is provided with an antenna 7*a*. The antenna 7*a* is telescopically mounted on the upper part of the cellular phone 1 casing, and is designed to exchange data with the base station B.

When transmissions are received, the modem unit performs a demodulating routine on the signal input from the antenna 7*a* to produce a signal that can be processed by the coding/decoding unit. When transmissions are sent, a routine is also performed to modulate the digital signal converted in the coding/decoding unit into a signal that can be wirelessly transmitted. The coding/decoding unit is configured according to a codec (CODEC) and is designed to perform processing (demodulation) to convert the digital signal input from the modem unit into an analog signal when transmissions are received. When transmissions are sent, processing (modulation) is also performed for converting a voice signal or other analog signal into a digital signal, and the converted digital signal is compressed into a quantity of data suitable for transmission.

The voice processor 9 comprises a converter, amplifier, or the like, and is provided with a microphone 9*a* and speaker 9*b*. During a call, the voice processor 9 converts the voice data input from the control unit 2 into analog signals in the converter, and drives the speaker 9*b* via the amplifier. During a call, the voice processor 9 also converts the voice signal input from the microphone 9*a* into a wirelessly transmittable digital signal by means of the converter, and outputs the result to the wireless unit 7.

Figure 4:
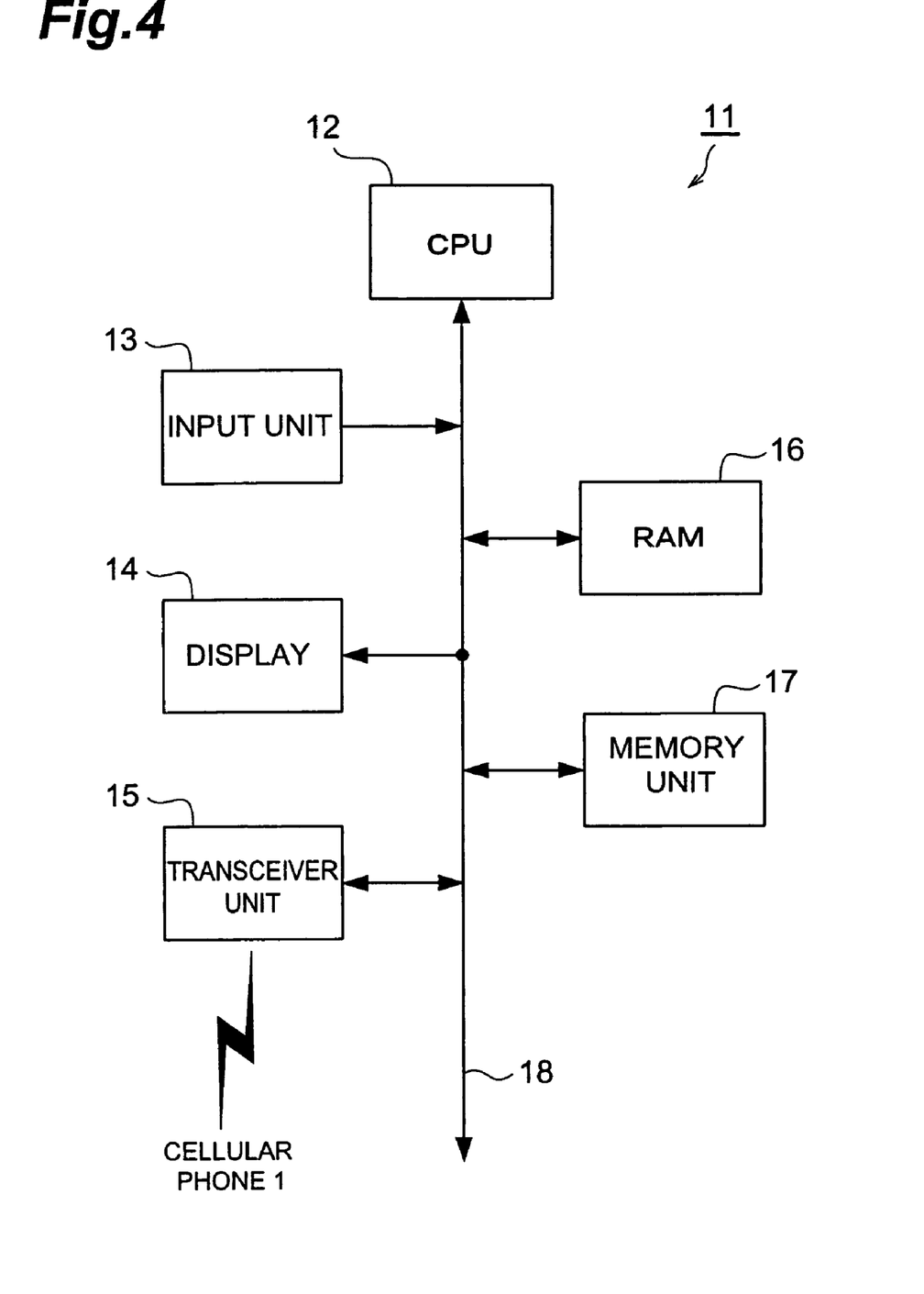
FIG. 4 is a block diagram depicting the functional configuration of the application delivery server.

The internal configuration of the application delivery server 11 will next be described with reference to FIG. 4. As depicted in FIG. 4, the application delivery server 11 comprises a CPU 12, input unit 13 (corresponds to attribute setting means), display 14, transceiver unit 15 (corresponds to transmitting means), RAM 16, and memory unit 17. These elements are connected to each other by a bus 18.

The CPU (Central Processing Unit) 12 retrieves various programs stored in the memory unit 17 and deploys them to the RAM 16, and centrally controls the operation of each element according to the program. The CPU 12 also executes the hereinafter described transmission routine (see FIGS. 7A to 7C) according to the program deployed to the RAM 16, and the results of the routine are stored in the RAM 16 and displayed on the display 14. The results of the routine, which are stored in the RAM 16, are then retained in the memory unit 17.

The input unit 13 is provided with a keyboard, mouse, and other elements for allowing the operator to set the ADF content related to the application software to be delivered, and the input information is outputted as an input-signal to the CPU 12.

The display 14 comprises an LCD (Liquid Crystal Display), CRT (Cathode Ray Tube), or other display apparatus.

The transceiver unit 15 exchanges data via the packet communication network N under the control of the CPU 12. In particular, the transceiver unit 15 has the function whereby an application stored in the memory unit 17 and an ADF that corresponds to this application are downloaded to the cellular phone 1 via the packet communication network N and the base station B.

The RAM (Random Access Memory) 16 forms a temporary storage area for the various programs, ADF data, and other types of data retrieved from the memory unit 17 for the various routines executed and controlled by the CPU 12.

The memory unit 17 stores ADF data and various programs transmitted during the hereinafter described transmission routine.

Figure 5:
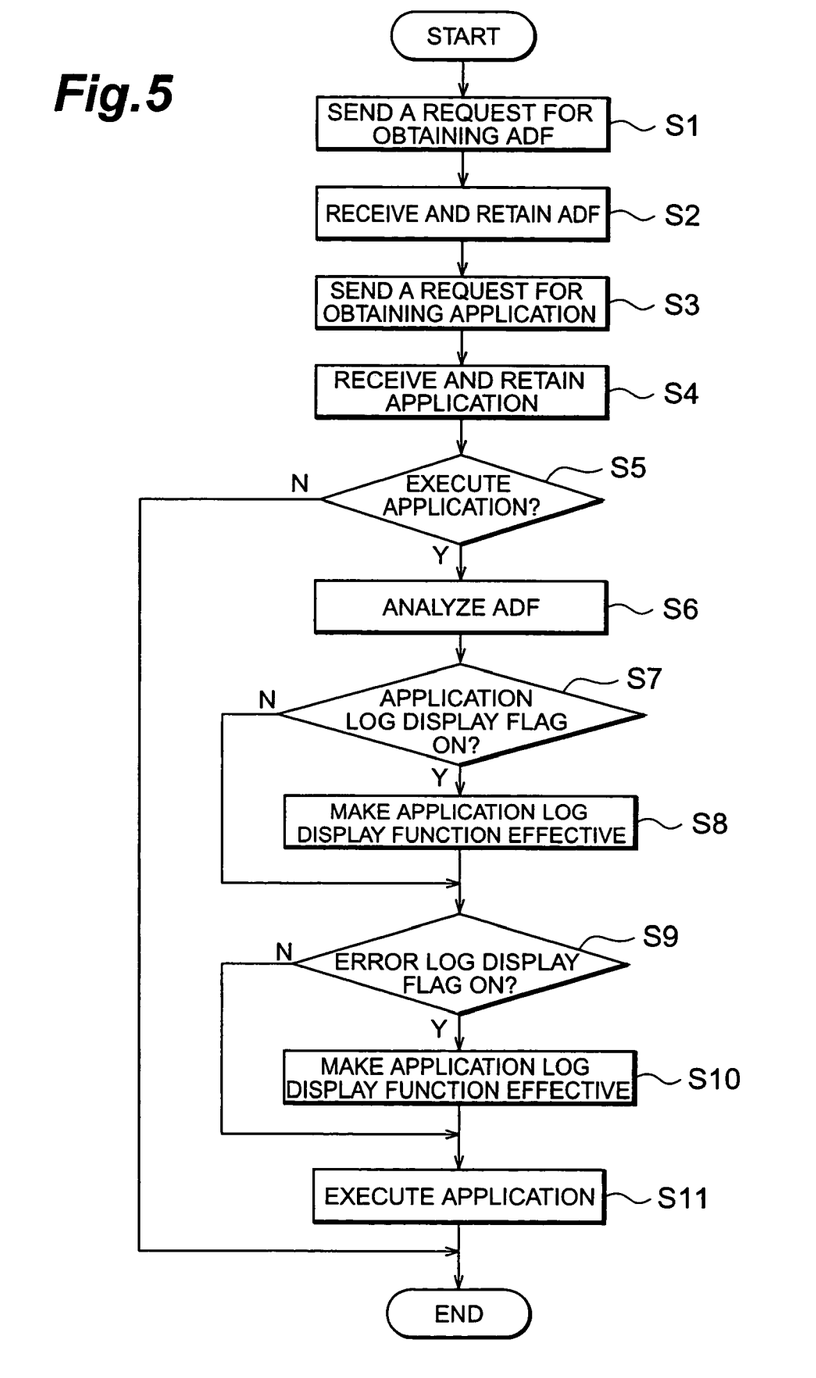
FIG. 5 is a flowchart describing the routine on the cellular phone.
Figure 6:
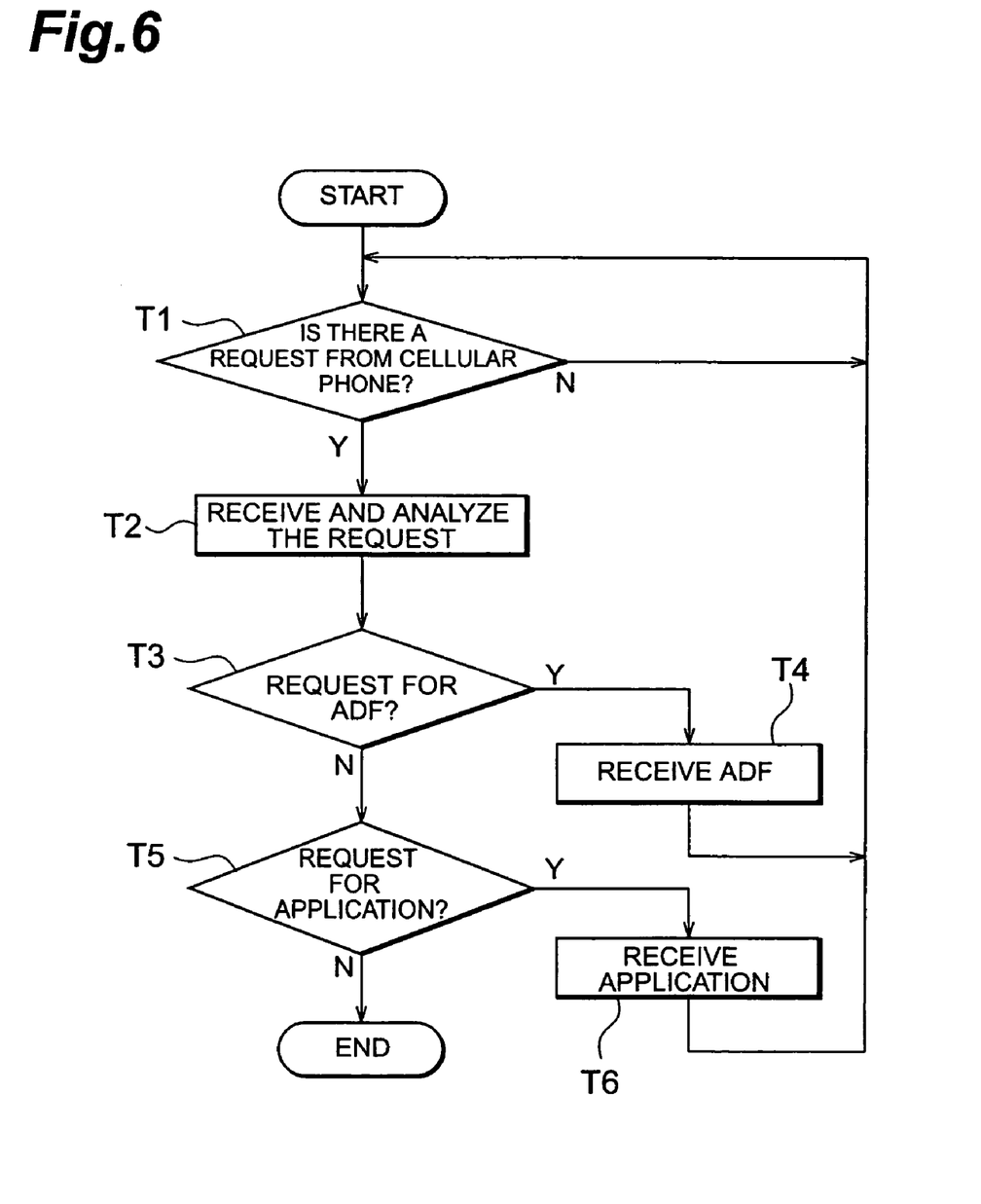
FIG. 6 is a flowchart describing the routine on the application delivery server.

The operation of the cellular phone 1 and application delivery server 11 in the present embodiment will now be described with reference to FIGS. 5 and 6. FIG. 5 is a flowchart for describing the routine of the cellular phone 1, and FIG. 6 is a flowchart for describing the routine of the application delivery server 11. The present embodiment is described with reference to an example in which an ADF and an application are delivered from the application delivery server 11 to the cellular phone 1 in the order indicated.

The routine in the application delivery server 11 will first be described. In T1 of FIG. 6, the application delivery server 11 operates in standby for receipt of a request (for example, a request for obtaining the desired application, a request for obtaining an ADF related to the desired application, or the like) from the cellular phone 1, the operation proceeds to T2 when a request arrives from the cellular phone 1, the request is received, and the content thereof is analyzed. It is then determined in T3 whether the request is a request for obtaining an ADF related to the desired application, and the ADF related to the desired application is transmitted to the cellular phone 1 in T4 if it is concluded that the request is a request for obtaining an ADF.

It is determined in the subsequent T5 whether the request is a request for obtaining the desired application, and if it is concluded that the request is a request for obtaining an application, the desired application is transmitted to the cellular phone 1 in T6, and the routine in FIG. 6 is completed. The routine in FIG. 6 above allows the application delivery server 11 to transmit the desired application or an ADF related to the desired application to the cellular phone 1 in accordance with requests from the cellular phone 1.

The routine in the cellular phone 1 will now be described. In S1 of FIG. 5, the cellular phone 1 first transmits a request for obtaining an ADF related to the desired application to the application delivery server 11. When the ADF is transmitted in accordance with the request from the application delivery server 11 by the routine in FIG. 6 above, the ADF is received and retained in the ADF storage area 61 in S2.

A request for obtaining the desired application is transmitted in the subsequent S3. When the desired application is transmitted in accordance with the request from the application delivery server 11 by the routine in FIG. 6 above, the desired application is received and retained in the application storage area 62 in S4. The downloading of the desired application and the ADF related thereto is completed for the cellular phone 1 at this time. The routine in FIG. 5 is hereby completed if there is no operation that instructs the application to be executed.

The operation proceeds to S6 and the ADF related to the application is analyzed if the user of the cellular phone 1 performs an operation that instructs the application to be executed. It is determined in S7 whether the application log display flag in the ADF is on ("1"), and the function for displaying the application log is made effective in S8 if the application log display flag is on.

It is determined in the subsequent S9 whether the error log display flag in the ADF is on ("1"), and the function for displaying the error log is made effective in S10 if the error log display flag is on. At this time the application log display function and error log display function are made effective in the cellular phone 1 in accordance with the settings for the application log display flag and error log display flag in the ADF from the application delivery server 11. The operation then proceeds to S11, and the application is executed. The application log and error log are recorded in a specific area of the memory unit 6 during the execution of the application.

Figure 7A:
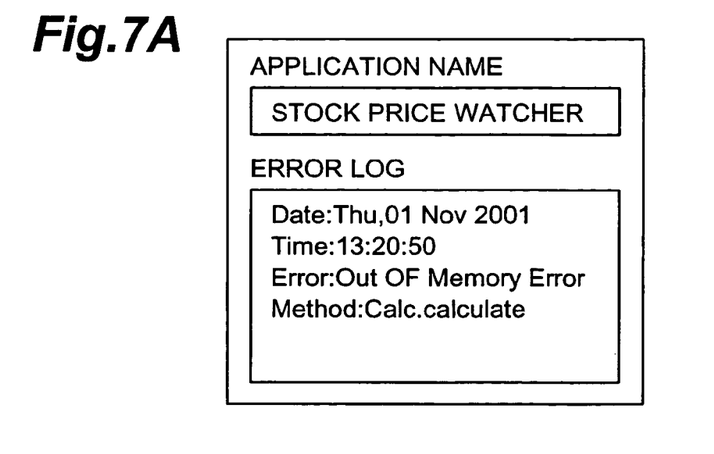
FIG. 7A is a diagram depicting a display example of a case in which the error log display function alone is effective.

If, for example, the subject application at this time is AP001 in FIG. 3, the application log display flag in ADF 61*a* of AP001 is set to "off," and the error log display flag is set to "on," so the error log display function alone is made effective, and the error log alone is displayed on the display 5, as shown in FIG. 7A.

Figure 7B:
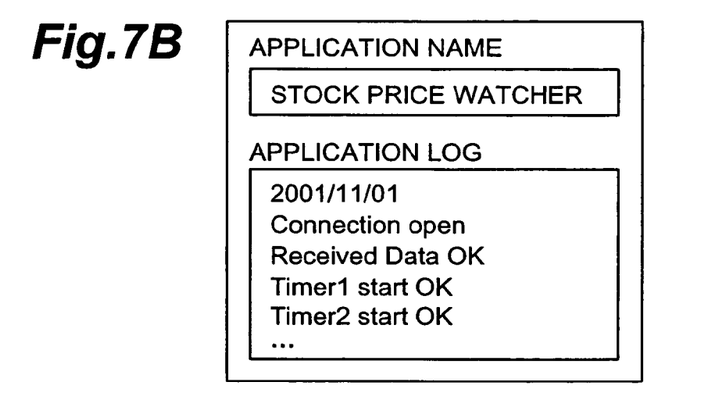
FIG. 7B is a diagram depicting a display example of a case in which the application log display function alone is effective.

If, on the other hand, the subject application is AP002 in FIG. 3, the application log display flag in ADF 61*b* of AP002 is set to "on," and the error log display flag is set to "off," so the application log display function alone is made effective, and the application log alone is displayed on the display 5, as shown in FIG. 7B.

Figure 7C:
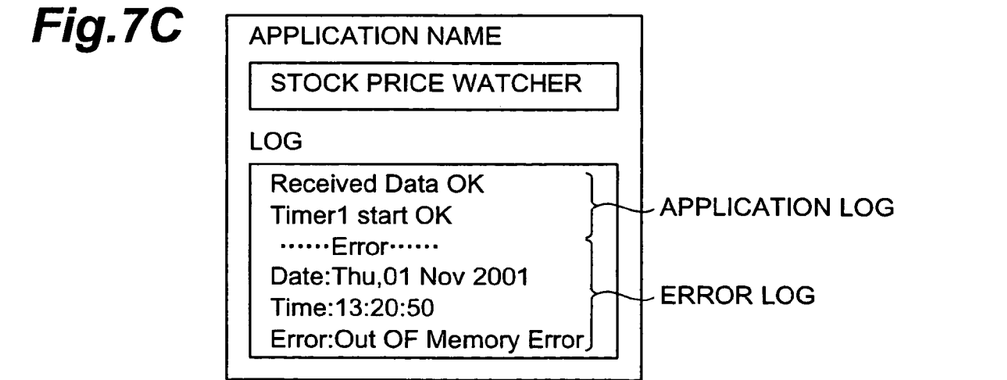
FIG. 7C is a diagram depicting a display example of a case in which both the error log display function and the application log display function are effective.

Furthermore, if the subject application is AP003 in FIG. 3, the application log display flag and error log display flag in ADF 61*c* of AP003 are both set to "on," so both the application log display function and the error log display function are made effective, and both the application log and the error log are displayed on the display 5, as shown in FIG. 7C. In this manner, the routine in FIG. 5 is completed According to the present embodiment, the application log display function and the error log display function are each made effective in the cellular phone 1 in accordance with the settings for the application log display flag and error log display flag in the ADF from the application delivery server 11, and the display of the application log and error log can be controlled in the above-described manner.

An ADF is thereby set and transmitted to the cellular phone 1 so that, for example, such log information (particularly an error log) is displayed in the application delivery server 11 during development of application software, whereby the log information can be displayed and outputted to the display 5 of the cellular phone 1, the efficiency with which the developer detects individual errors can be improved, and performance testing of applications on the mobile communication terminal can be smoothed.

By contrast, an ADF is set and transmitted to the cellular phone 1 such that log information is not displayed in the application delivery server 11 at the time when the development of application software is completed and the product is shipped, whereby control can be performed such that the log information is not displayed or outputted to the display 5 of the cellular phone 1, and execution state information can be prevented from being disclosed or leaked to persons (for example, software experts or users of the mobile communication terminal) who are not intended for viewing the execution state information.

The aspects of the present embodiment were described with reference to a preferred example of the application delivery system pertaining to the present invention, but are not limited thereby.

For example, the embodiment was described with reference to a cellular phone as a mobile communication terminal, but another information device capable of wireless communication, such as a PHS (Personal Handyphone System) or a PDA (Personal Digital Assistance), may also be used. It is also apparent that no particular limitations are imposed on the application software to which the present invention can be applied. In addition, any sequence may be used for transmitting the ADF and application to the cellular phone, such as transmitting these concurrently or transmitting the application and ADF in the order indicated.

The above embodiment was also described with reference to an aspect in which a cellular phone that corresponded to the mobile communication terminal pertaining to the present invention received application software and attribute information from an application delivery server, but it is also possible for the mobile communication terminal pertaining to the present invention to receive application software and attribute information from an information processing device other than an application delivery server, or to receive application software and attribute information via a memory stick or other storage medium.

A description will now be given concerning an execution state display control program and computer-readable recording medium (abbreviated hereinbelow as "a recording medium") pertaining to an embodiment of the present invention. A memory stick detachably mountable on a cellular phone may, for example, be used as the recording medium in the present embodiment.

Figure 9:
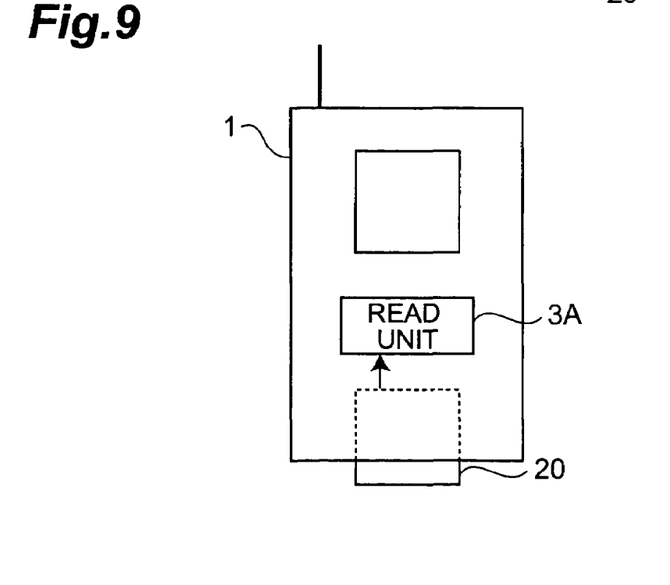
FIG. 9 is a diagram depicting a state in which a memory stick is mounted on a cellular phone.

FIG. 9 depicts a state in which a memory stick 20 is mounted as a recording medium on a cellular phone 1 in accordance with the present embodiment. The cellular phone 1 contains a read unit 3A provided as a type of the input unit 3 shown in FIG. 2, and the read unit 3A is enabled to read various types of information, programs, and the like from the memory stick 20 that is set at a specific position.

Figure 8:
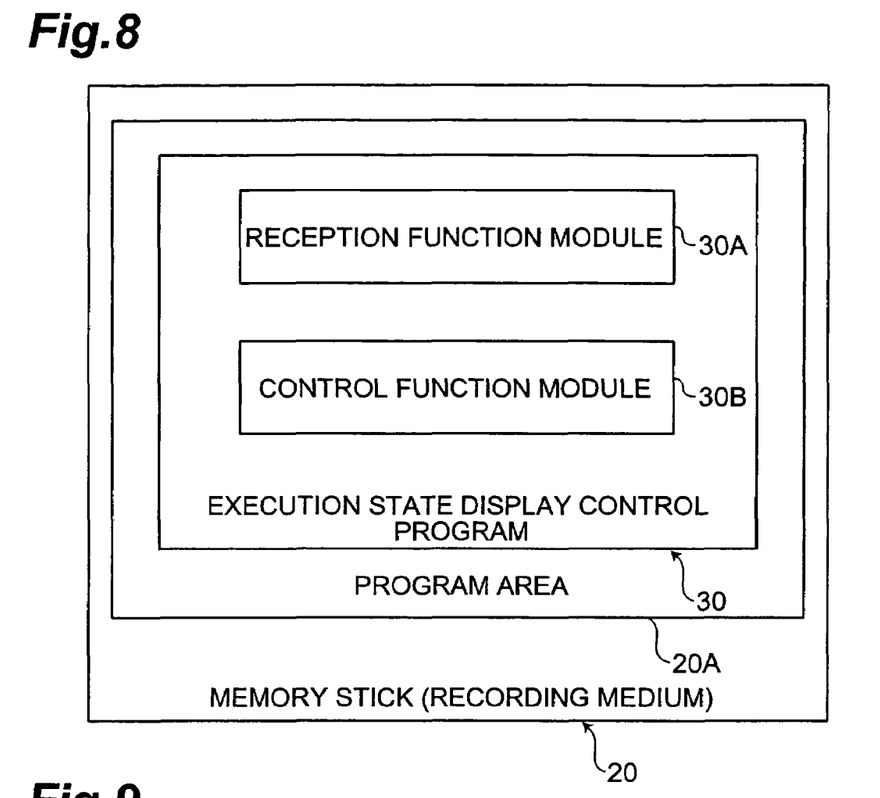
FIG. 8 is a conceptual diagram depicting the structure of the execution state display control program.

FIG. 8 depicts the structure of the execution state display control program 30. The execution state display control program 30 comprises a reception function module 30A that causes the control unit 2 (that is, computer) of the cellular phone 1 in FIG. 2 to function as reception means for receiving application software together with attribute information that indicates whether the execution state information outputted to a specific storage area by the application software should be displayed, and a control function module 30B that causes the control unit to function as control means for controlling the display output of the execution state information on the basis of the received attribute information. The execution state display control program 30 is stored in a program area 20A for storing programs on the memory stick 20.

INDUSTRIAL APPLICABILITY

As described above, attribute information indicating that execution state information should be displayed is sent in accordance with the present invention to a mobile communication terminal from an application software delivery apparatus during development of application software, whereby the execution state information can be displayed and outputted to the display means of the mobile communication terminal, the efficiency with which the developer detects individual errors can be improved, and performance testing of applications on the mobile communication terminal can be smoothed.

In addition, attribute information indicating that execution state information should not be displayed is sent to the mobile communication terminal from the application software delivery apparatus when development of the application software is completed and the product is shipped, whereby control can be performed such that the execution state information is not displayed or outputted to the display means of the mobile communication terminal, and the execution state information can be prevented from being disclosed or leaked to persons (for example, software experts or users of the mobile communication terminal) who are not intended for viewing the execution state information.

The invention claimed is:

1. A mobile communication terminal, comprising:
    display means for displaying information;
    reception means for receiving application software that outputs execution state information to a specific storage area during execution, and for receiving, from an application software delivery apparatus, attribute information that indicates whether the execution state information outputted by the application software to the specific storage area should be displayed when the execution state information is generated during execution of the application software; and
    control means for controlling the display output of the execution state information to the display means on the basis of the attribute information received by the reception means.

2. The mobile communication terminal according to claim 1, wherein the control means controls the display output of the execution state information by switching the display output to the display means between a screen on which the execution state information is displayed and a screen on which the execution state information is not displayed.

3. The mobile communication terminal according to claim 1, wherein the execution state information comprises at least one type of information selected from among log information for the execution, parametric information related to the execution, and error information at the time of execution.

4. A mobile communication terminal for communicating with an application software delivery apparatus for delivering application software that stores execution state information in a specific storage area during execution, said mobile communication terminal comprising:
    display means for displaying information;
    reception means for receiving application software together with attribute information that indicates whether the execution state information stored in the specific storage area by the application software should be displayed when the execution state information is generated during execution of the application software from the application software delivery apparatus; and
    control means for controlling the display output of the execution state information to the display means on the basis of the attribute information received by the reception means.

5. An application software delivery apparatus for communicating with a mobile communication terminal which comprises display means for displaying information; reception means for receiving application software that outputs execution state information to a specific storage area during execution, and for receiving attribute information that indicates whether the execution state information outputted by the application software to the specific storage area should be displayed when the execution state information is generated during execution of the application software; and control means for controlling the display output of the execution state information to the display means based on the attribute information received by the reception means;
    said application software delivery apparatus comprising:
    attribute setting means for setting attribute information that indicates whether execution state information stored in a specific storage area by application software should be displayed when the execution state information is generated during execution of the application software, to the application software which is to be delivered; and
    transmitting means for transmitting the application software to be delivered and the attribute information that has been set by the attribute setting means, to the mobile communication terminal.

6. An application software delivery system, comprising:
    a mobile communication terminal which comprises display means for displaying information; reception means for receiving application software that outputs execution state information to a specific storage area during execution, and for receiving attribute information that indicates whether the execution state information outputted by the application software to the specific storage area should be displayed when the execution state information is generated during execution of the application software; and control means for controlling the display output of the execution state information to the display means based on the attribute information received by the reception means; and
    an application software delivery apparatus which comprises attribute setting means for setting attribute information that indicates whether the execution state information outputted to a specific storage area by application software should be displayed, to the application software which is to be delivered; and transmitting means for transmitting the application software to be delivered and the attribute information that has been set by the attribute setting means,
    and being used for communication between the mobile communication terminal and the application software delivery apparatus.

7. An execution state display control method for a mobile communication terminal that comprises display means for displaying information, said execution state display control method comprising:
    a reception step for receiving application software that outputs execution state information to a specific storage area during execution, and also receiving, from an application software delivery apparatus, attribute information that indicates whether the execution state information outputted to the specific storage area by the application software should be displayed when the execution state information is generated during execution of the application software; and
    a control step for controlling the display output of the execution state information to the display means on the basis of the received attribute information.

8. The execution state display control method according to claim 7, wherein the display output of the execution state information is controlled in the control step by switching the display output to the display means between a screen on which the execution state information is displayed and a screen on which the execution state information is not displayed.

9. The execution state display control method according to claim 7, wherein the execution state information comprises at least one type of information selected from among log information for the execution, parametric information related to the execution, and error information at the time of execution.

10. An execution state display control method for a mobile communication terminal that comprises display means for displaying information and that communicates with an application software delivery apparatus for delivering application software that stores execution state information in a specific storage area during execution, said execution state display control method comprising:

a reception step for receiving application software together with attribute information that indicates whether the execution state information stored in the specific storage area by the application software should be displayed when the execution state information is generated during execution of the application software, from the application software delivery apparatus; and a control step for controlling the display output of the execution state information to the display means on the basis of the received attribute information.

11. An execution state display control program for causing a computer provided to a mobile communication terminal comprising display means for displaying information to function as:

reception means for receiving application software that outputs execution state information to a specific storage area during execution, and for receiving, from an application software delivery apparatus, attribute information that indicates whether the execution state information outputted to the specific storage area by the application software should be displayed when the execution state information is generated during execution of the application software; and control means for controlling the display output of the execution state information to the display means on the basis of the attribute information received by the reception means.

12. A computer-readable recording medium, wherein the execution state display control program according to claim 11 is recorded thereon.

* * * * *